(12) United States Patent
Arviv et al.

(10) Patent No.: US 8,494,099 B2
(45) Date of Patent: Jul. 23, 2013

(54) SIGNAL PROCESSING USING MODIFIED BLOCKWISE ANALYTIC MATRIX INVERSION

(75) Inventors: Eliahou Arviv, Modiin (IL); Daniel Briker, Kfar Saba (IL); Yitzhak Casapu, Tel Aviv (IL)

(73) Assignee: LSI Corporation, San Jose, CA (US)

( * ) Notice: Subject to any disclaimer, the term of this patent is extended or adjusted under 35 U.S.C. 154(b) by 962 days.

(21) Appl. No.: 12/555,025

(22) Filed: Sep. 8, 2009

(65) Prior Publication Data

US 2011/0058619 A1 Mar. 10, 2011

(51) Int. Cl.
*H03D 1/04* (2006.01)

(52) U.S. Cl.
USPC ........... 375/346; 375/229; 375/230; 375/232; 375/233; 375/260; 375/267; 375/316; 375/340; 375/347; 375/350; 455/63.1; 455/67.13; 455/101; 455/114.2; 455/132; 455/296; 455/500; 455/562.1; 370/210; 370/335; 370/342; 370/464; 370/480; 341/173; 341/180; 333/18; 333/28 R; 327/551; 708/300

(58) Field of Classification Search
USPC ................ 375/229, 230, 232, 233, 260, 267, 375/316, 340, 346, 347, 350; 455/63.1, 67.13, 455/101, 114.2, 132, 296, 500, 562.1; 370/210, 370/335, 342, 464, 480; 341/173, 180; 327/551; 333/18, 28 R; 708/300
See application file for complete search history.

(56) References Cited

U.S. PATENT DOCUMENTS

| | | | | |
|---|---|---|---|---|
| 5,319,586 | A | 6/1994 | Gupta et al. | 364/735 |
| 5,847,977 | A | 12/1998 | Jhung | 364/725.03 |
| 6,690,660 | B2 | 2/2004 | Kim et al. | 370/335 |
| 7,054,664 | B2 | 5/2006 | Nagaraj | 455/562.1 |
| 7,388,935 | B2 | 6/2008 | Hui | 375/340 |
| 7,420,916 | B2 | 9/2008 | Zhang et al. | 370/210 |
| 2004/0034837 | A1* | 2/2004 | Lowther et al. | 716/1 |
| 2006/0109891 | A1* | 5/2006 | Guo et al. | 375/147 |
| 2008/0205259 | A1 | 8/2008 | Shtin | 370/208 |
| 2008/0225979 | A1* | 9/2008 | Prasad et al. | 375/285 |
| 2008/0304600 | A1 | 12/2008 | Bottomley | 375/340 |
| 2009/0052513 | A1 | 2/2009 | Heikkila | 375/230 |
| 2009/0120634 | A1 | 5/2009 | Liu et al. | 166/250.01 |

OTHER PUBLICATIONS

"*Numerical Recipes in C: The Art of Scientific Computing*," by William H. Press et al., Second Edition, Cambridge University Press, 1992, pp. iii-xv and 71-90.

(Continued)

*Primary Examiner* — Leon Flores
(74) *Attorney, Agent, or Firm* — Mendelsohn, Drucker & Associates, P.C.; David L. Cargille; Steve Mendelsohn

(57) ABSTRACT

In one embodiment, a method for signal processing is provided that uses an improved inversion to mitigate the imprecision introduced by fast approximate methods for division. An input signal is received and processed to generate a matrix M. The matrix M is inverted to generate an inverted matrix $M^{-1}$. Matrix M is inverted by (i) decomposing the matrix M into a plurality of first sub-matrices, (ii) generating, based on the first sub-matrices and without any division operations, numerators for a plurality of second sub-matrices of the inverted matrix $M^{-1}$, (iii) generating, based on the first sub-matrices and without any division operations, denominators for the second sub-matrices, and (iv) generating the second sub-matrices based on the numerators and denominators. The inverted matrix $M^{-1}$ is processed to generate an output signal. Accordingly, a reduction in noise level from inaccuracy in division is achieved, and computational complexity is reduced.

24 Claims, 7 Drawing Sheets

OTHER PUBLICATIONS

"*Complexity Reduction of Matrix Manipulation for Multi-User STBC-MIMO Decoding*," by Johan Eilert et al., Sarnoff Symposium, 2007 IEEE, Apr. 30-May 2, 2007, Princeton, NJ, ISBN: 978-1-4244-2483-2, INSPEC Accession No. 10076341, Digital Object Identifier: 10.1109/SARNOF.2007.4567354, published Jul. 16, 2008, 5 pgs.

"*Efficient Complex Matrix Inversion for MIMO Software Defined Radio*," by Johan Eilert et al., IEEE International Symposium on Circuits and Systems, ISCAS 2007, Jul. 2007, pp. 2610-2613.

"*Channel Tracking versus Frequency Hopping for Uplink LTE*," by Ken Eriksson, Master's Degree Project, Stockholm Sweden, Mar. 2007, XR-EE-KT 2007:003, 35 pgs.

"*Single Carrier FDMA*," by Hyung G. Myung, hgmyung@ieee.org, May 15, 2008, 64 pgs.

"*The Matrix Cookbook*," by Kaare Brandt Petersen et al., http://matrixcookbook.com, Version: Sep. 5, 2007, 66 pgs.

\* cited by examiner

200

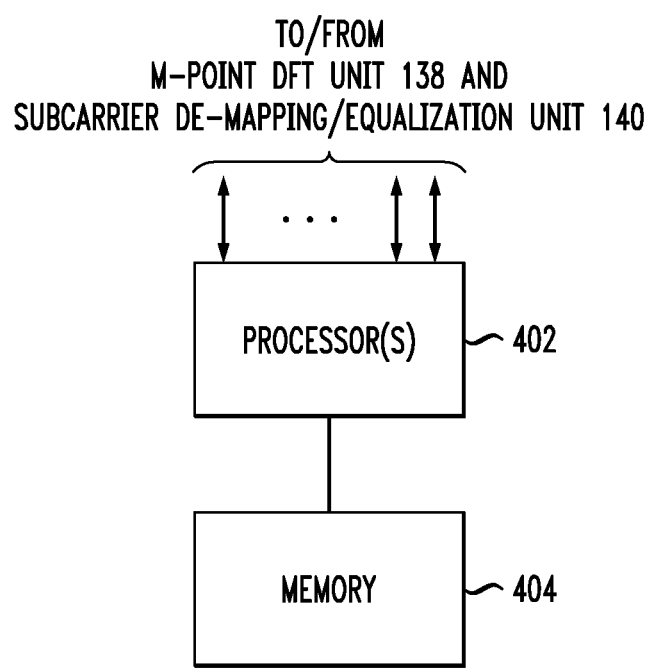

BAMI

MODIFIED BAMI

FIG. 7

TABLE 1

| PRECISION BITS | 5 | 6 | 7 | 8 | 9 | 10 |
|---|---|---|---|---|---|---|
| 4 x 4 | 2.39 | 2.56 | 2.05 | 1.99 | 1.65 | 1.97 |
| 5 x 5 | 3.20 | 3.19 | 3.29 | 3.61 | 3.22 | 3.40 |
| 6 x 6 | 3.25 | 3.12 | 3.13 | 3.15 | 3.16 | 3.32 |

SIGNAL PROCESSING USING MODIFIED BLOCKWISE ANALYTIC MATRIX INVERSION

BACKGROUND OF THE INVENTION

1. Field of the Invention

The present invention relates to signal processing in a wireless communications system, and, in particular, to channel estimation using blockwise analytic matrix inversion in a wireless communication system.

2. Description of the Related Art

The Universal Mobile Telecommunications System (UMTS) is a high-speed cellular radio system that provides digital data and voice communications. UMTS has recently evolved from 3G systems to 3.5G systems using High-Speed Downlink Packet Access (HSDPA) and High-Speed Uplink Packet Access (HSUPA), and still continues to evolve. The UMTS Long Term Evolution (LTE) protocol is currently being specified in 3GPP Release 8 to ensure its competitiveness for the next ten years and beyond. LTE, which is also known as Evolved UMTS Terrestrial Radio Access (UTRA) and Evolved UMTS Terrestrial Radio Access Network (UT-RAN), provides new physical-layer concepts and protocol architectures for UMTS. See, e.g., Application Note 1MA111, "UMTS Long Term Evolution (LTE) Technology Introduction," Rohde & Schwarz GmbH & Co. KG, available at http://www2.rohde-schwarz.com/en/service_and_support/Downloads/Application_Notes/, hereby incorporated by reference in its entirety.

According to the 3GPP Release 8 standard, the LTE downlink uses Orthogonal Frequency-Division Multiple Access (OFDMA) modulation. The LTE uplink uses Single-Carrier FDMA (SC-FDMA) modulation, which allows a relatively low-complexity receiver implementation in the base station. See, e.g., "Evolved Universal Terrestrial Radio Access (E-UTRA); Physical Channels and Modulation (Release 8)," 3rd Generation Partnership Project, 3GPP TS 36.211 V8.7.0 (May 2009), hereby incorporated by reference in its entirety.

FIG. 1 depicts a simplified block diagram of an LTE uplink 100, including an LTE uplink transmitter 110 (e.g., located in a UMTS mobile terminal) and an LTE uplink receiver 130 (e.g., located in a UMTS base station). In transmitter 110, serial data 112 to be transmitted is modulated (via quadrature-amplitude-modulation (QAM) or quadrature-phase-shift-keying (QPSK) modulation) by modulator 114 and converted into N parallel streams by serial-to-parallel converter 116. The N parallel streams are then input to an N-point discrete Fourier transform (DFT) unit 118 (or, alternatively, a fast Fourier transform (FFT) unit) to convert the streams to the frequency domain. Subcarrier mapping unit 120 maps the N frequency-domain streams to M available subcarrier frequencies (where M>N) and adds a plurality of demodulation reference symbols (DMRS) symbols (referred to below as pilot signals) in the frequency-domain (as regular OFDM symbols). Notably, the OFDM-based pilot signals and the SC-FDMA-based data symbols are separated in time. M-point inverse discrete Fourier transform (IDFT) unit 122 (or, alternatively, an inverse fast Fourier transform (IFFT) unit) then uses the frequency-domain, subcarrier-mapped streams as bins to create a block of M SC-FDMA symbols, each mapped to a different subcarrier frequency. The M SC-FDMA symbols output from IDFT unit 122 are serialized by parallel-to-serial converter 124 to create a time-domain SC-FDMA signal, and cyclic extension unit 126 adds to the time-domain SC-FDMA signal a cyclic prefix that enables frequency-domain processing at receiver 130 and thus facilitates significantly a reduction in the overall computational complexity of receiver 130. Finally, DAC/RF unit 128 converts the time-domain signal to analog and transmits the analog signal over the LTE uplink.

In receiver 130, RF/ADC unit 132 receives the transmitted analog signal and converts it to a digital signal, and cyclic extension unit 134 removes the cyclic prefix. The resulting signal is converted into M parallel SC-FDMA symbols at serial-to-parallel converter 136, and the M parallel SC-FDMA symbols are input to M-point DFT unit 138, which removes the M subcarrier frequencies and outputs M parallel words. The M parallel words are then input to (i) channel estimator unit 150 and (ii) subcarrier de-mapping/equalization unit 140. Channel estimator unit outputs, for each parallel word, an estimated channel transfer function, based on a locally generated pilot signal and a corresponding pilot signal contained within the received signal. Subcarrier de-mapping/equalization unit 140 (i) equalizes the data for each sub-carrier in the frequency domain based on the corresponding estimated channel transfer function from channel estimator unit 150 and (ii) de-maps the M parallel words to N parallel words. N-point IDFT unit 142 then converts the N parallel words to N time-domain parallel signals, and parallel-to-serial converter 138 converts the N time-domain parallel signals to serial data. The serial data is then demodulated by detector/demodulator unit 146 to recover data 148.

To assist with channel estimation, the LTE uplink protocol includes the transmission of one or more known pilot signals at regular intervals, along with data signals. As described above, channel estimator 150 in receiver 130 uses these transmitted pilot signals to estimate channel characteristics in the LTE uplink. Equalizer unit 142 in receiver 130 then uses the channel estimates to enable accurate data reception and demodulation. Conventional techniques for channel estimation include, e.g., the linear Minimum-Mean-Square-Error (LMMSE) and Least-Squares (LS) techniques.

An LTE uplink may also include advanced antenna technologies, such as Multiple Input Multiple Output (MIMO). See, e.g., A. Toskala et al., "Utran Long Term Evolution in 3GPP," IEEE 17th International Symposium on Personal, Indoor and Mobile Radio Communications, pp. 1-5, September 2006, hereby incorporated by reference in its entirety. In a MIMO-based system, there are at least two transmitter antennas (each one corresponding to separate MIMO user) and at least two receiver antennas. (In a MIMO-based system, the number of receiver antennas is conventionally greater or equal to the number of transmitter antennas). Further, more than two transmitter antennas and two receiver antennas (e.g., four transmitter antennas and four receiver antennas (4×4 MIMO) may be used. Indeed, the 3GPP Release 8 standard specifies tests of the Physical Uplink Shared Channel not only with two receive antennas but also with four receive antennas. See, e.g., "Evolved Universal Terrestrial Radio Access (E-UTRA); Base Station (BS) Radio Transmission and Reception," 3rd Generation Partnership Project, 3GPP TS 36.104 V8.5.0 (March 2009), hereby incorporated by reference in its entirety. One may therefore assume that the number of MIMO transmitting antennas is less or equal to two and four, respectively.

FIG. 2 represents a simple two-by-two MIMO LTE system 200 having two transmitter antennas 202 and 204, which transmit signals over four transmission paths 206, 208, 210, and 212 to two receiver antennas 214 and 216, where each receiver antenna 214, 216 receives a signal corresponding to the superposition of signals arriving over two different transmission paths. For example, the signal received at receiver antenna 214 corresponds to the superposition of (i) the signal transmitted from transmitter antenna 202 via transmission path 206 and (ii) the signal transmitted from transmitter antenna 204 via transmission path 208. In general, each transmitter antenna 202, 204 is associated with its own transmitter analogous to transmitter 110 of FIG. 1, and each receiver antenna 214, 216 is associated with its own receiver analogous to receiver 130 of FIG. 1.

In order to separate the transmitted pilot signals from each MIMO transmitter antenna 202, 204 received at each receiver antenna 214, 216, MIMO LTE system 200 may employ cyclic-shift transmit diversity (CSTD). CSTD is an adaptation of the idea of delay diversity to OFDM and SC-FDMA systems. With CSTD, each antenna element in a transmit array sends a circularly shifted version of the same pilot symbol. See, e.g., Javvin Technologies, Inc., Wireless Technology Terms, Glossary and Dictionary, at http://www.javvin.com/wireless/CSTD.html. For example, constant-amplitude zero-autocorrelation (CAZAC) sequences may be employed to provide a CSTD transmission scheme. Thus, in MIMO LTE system 200, the signal transmitted by transmitter antenna 204 is a circularly shifted version of the signal transmitted by transmitter antenna 202.

SUMMARY OF THE INVENTION

The present inventors have identified a significant problem with channel estimators using LS or LMMSE channel-estimation techniques—specifically, that conventional channel estimators perform matrix inversion in such a way as to introduce a substantial amount of error into the resulting channel estimates. Several conventional inversion methods exist, e.g., minor decomposition, Cholesky decomposition, LU decomposition, Blockwise Analytic Matrix Inversion (BAMI), Gauss method, etc. See Kaare Brandt Petersen and Michael Syskind Pedersen, *The Matrix Cookbook*, http://matrixcookbook.com/, hereby incorporated in its entirety by reference. All these methods require division operations, which increase significantly the algorithm complexity when the division is implemented in a precise classical iterative manner. Division is commonly approximated in ways that greatly reduce the cycle count (e.g., via a lookup table), but this approach inevitably reduces the computational precision of the division result. Moreover, because inversion algorithms are typically recursive, an overall accumulation of division errors along the execution of the algorithm is unavoidable. Indeed, such error accumulation may result in failure of the matrix inversion, especially if the input matrix has close to ill-conditioned properties (i.e., where the ratio of its largest eigenvalue to its smallest eigenvalue is large).

The above problem in the prior art is are addressed in one embodiment of the invention by performing channel estimation using a modified BAM inversion that mitigates the effects of using fast approximate methods for division (e.g., a lookup table). In one embodiment, divisions are deferred to the latest stages of the inversion, thus eliminating accumulation of errors in calculations.

More specifically, in one embodiment, the invention is a method of signal processing. An input signal is received and processed to generate a matrix M. The matrix M is inverted to generate an inverted matrix $M^{-1}$ by: (i) decomposing the matrix M into a plurality of first sub-matrices, (ii) generating, based on the first sub-matrices and without any division operations, numerators for a plurality of second sub-matrices of the inverted matrix $M^{-1}$, (iii) generating, based on the first sub-matrices and without any division operations, denominators for the second sub-matrices, and (iv) generating the second sub-matrices based on the numerators and denominators. The inverted matrix $M^{-1}$ is processed to generate an output signal.

In another embodiment, the invention is an apparatus for signal processing. The apparatus comprises at least one processor. The processor is adapted to: (a) receive an input signal; (b) process the input signal to generate a matrix M; (c) invert the matrix M to generate an inverted matrix $M^{-1}$ by: (c1) decomposing the matrix M into a plurality of first sub-matrices, (c2) generating, based on the first sub-matrices and without any division operations, numerators for a plurality of second sub-matrices of the inverted matrix $M^{-1}$, (c3) generating, based on the first sub-matrices and without any division operations, denominators for the second sub-matrices, and (c4) generating the second sub-matrices based on the numerators and denominators; and (d) process the inverted matrix $M^{-1}$ to generate an output signal.

BRIEF DESCRIPTION OF THE DRAWINGS

Other aspects, features, and advantages of the present invention will become more fully apparent from the following detailed description, the appended claims, and the accompanying drawings, in which like reference numerals identify similar or identical elements.

FIG. 4 is a block diagram illustrating a channel estimator in accordance with one embodiment of the invention.

FIG. 7 depicts Table 1, showing the difference (in dB) in noise level introduced by division inaccuracy between the conventional BAM inversion and the modified BAM inversion.

DETAILED DESCRIPTION OF THE INVENTION

Figure 3:
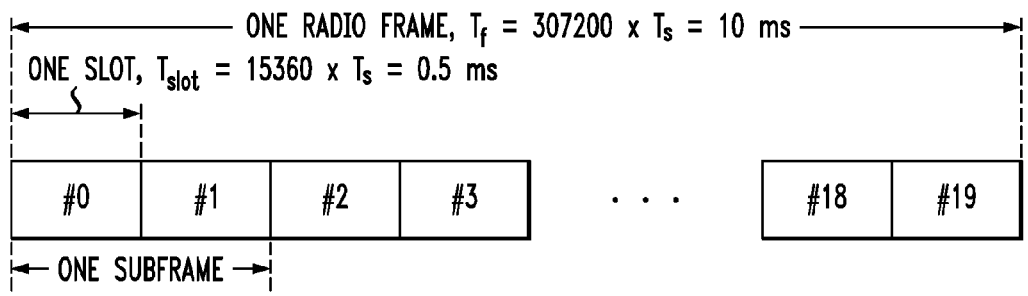
FIG. 3 is a timing diagram illustrating the structure of a prior-art radio frame in an LTE uplink.

FIG. 3 shows the structure of an exemplary radio frame (known as a "type 1" radio frame) in a frequency-division duplex (FDD) LTE system. Each radio frame is $T_f = 307200 \times T_s = 10$ ms long and consists of 20 slots of length $T_{slot} = 15360 \times T_s = 0.5$ ms, numbered from 0 to 19. A sub-frame is defined as two consecutive slots. Depending on the cyclic prefix length, each slot consists of 6 or 7 SC-FDMA symbols for an extended or normal cyclic prefix, respectively. Regardless of whether the system uses a normal or extended cyclic prefix, the pilot signals transmitted for channel estimation occupy the fourth SC-FDMA symbol.

A received signal y is the sum of (i) the convolution of an input pilot signal x with the channel impulse response h and (ii) Gaussian noise n as shown in Equation (1) below:

$$y = x*h + n \qquad (1)$$

Equation (1) can be written in the frequency domain as shown in Equation (2) below:

$$Y = XH + N \qquad (2)$$

where Y, X, H, and N respectively represent the received signal, transmitted signal, channel frequency response, and noise, all in the frequency domain. Equation (2) can be expressed as shown in Equation (3) below:

$$\begin{bmatrix} y_1 \\ y_2 \\ \vdots \\ y_M \end{bmatrix} = \begin{bmatrix} x_1 & & & 0 \\ & x_2 & & \\ & & \ddots & \\ 0 & & & x_M \end{bmatrix} \begin{bmatrix} h_1 \\ h_2 \\ \vdots \\ h_M \end{bmatrix} + \begin{bmatrix} n_1 \\ n_2 \\ \vdots \\ n_M \end{bmatrix}, \qquad (3)$$

where the pilot signal x is placed along the diagonal elements of the matrix X. See, e.g., L. Somasegaran, "Channel Estimation and Prediction in UMTS LTE," M.S. Thesis, Dept. of Electronic Systems, Aalborg Univ., Aalborg, Denmark, 2007 (hereinafter, "Somasegaran"), hereby incorporated by reference in its entirety. Equation (2) can also be represented as shown in Equation (4) below:

$$Y = XWC + N \qquad (4)$$

where H=WC, and W is the discrete Fourier transform (DFT) matrix with the element $W_{ik}$ defined as:

$$W_{ik} = \frac{1}{\sqrt{M_u}} e^{\frac{-2j\pi ik}{M_u}}$$

for i=0, ..., $M_u$–1; k=0, ..., L–1, where $M_u$ is the length of the pilot signal, and L is the number of taps. C is the channel impulse response with L taps.

Figure 1:
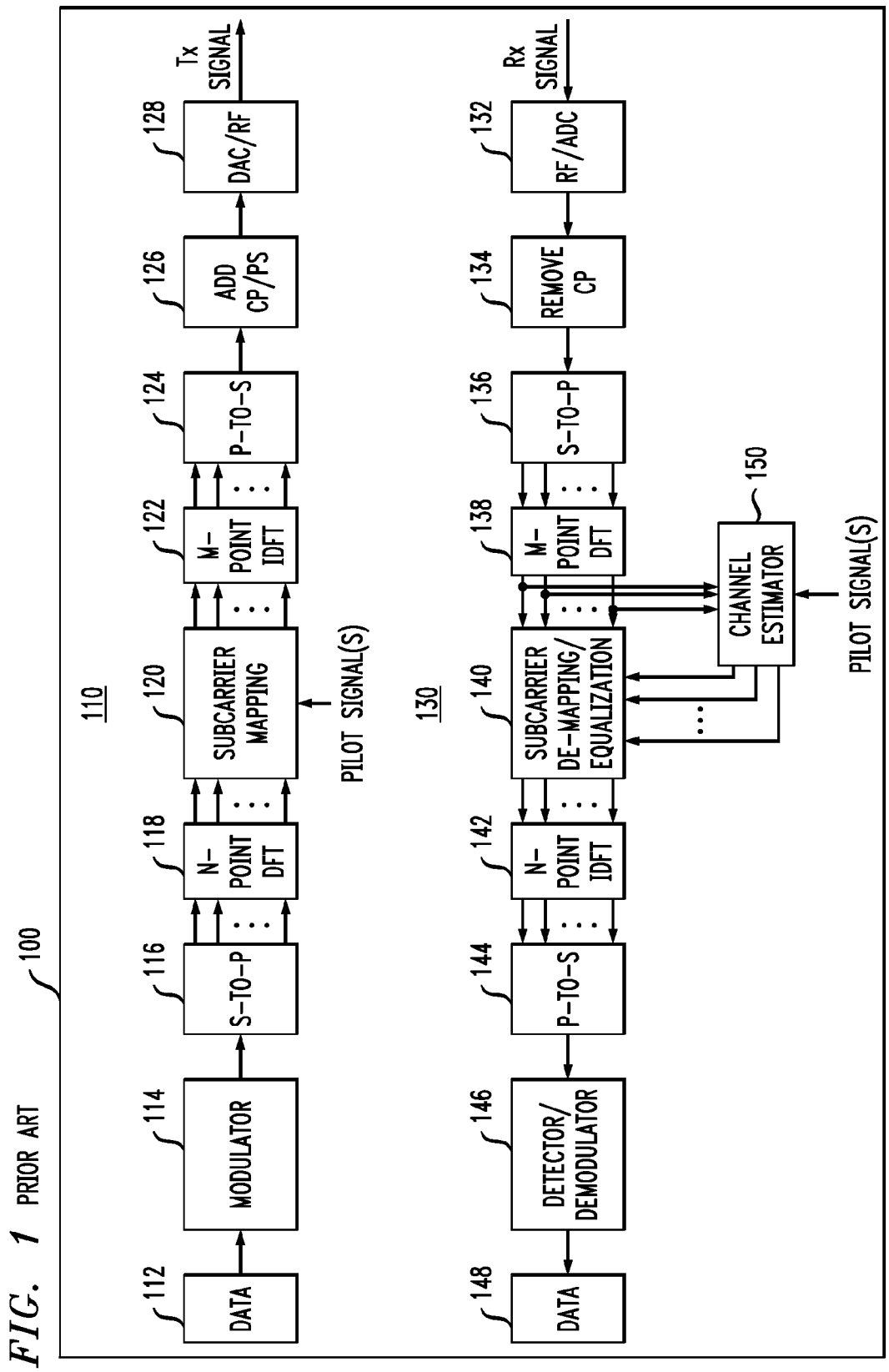
FIG. 1 is a block diagram of a prior-art LTE uplink, including a transmitter and a receiver.
Figure 2:
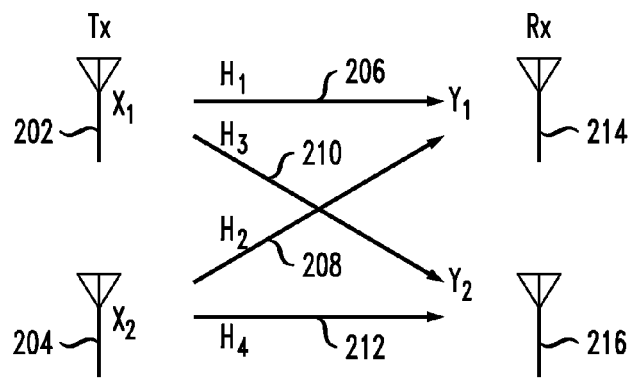
FIG. 2 is a block diagram illustrating a prior-art MIMO system with two transmitter antennas and two receiver antennas.

FIG. 2 shows a multiple-input, multiple-output (MIMO) system with two transmitter antennas 202, 204 and two receiver antennas 214, 216. The received signal can be expressed as shown in Equation (5) below:

$$Y_1 = \begin{bmatrix} X_1 & X_2 \end{bmatrix} \begin{bmatrix} H_1 \\ H_2 \end{bmatrix} + \begin{bmatrix} N_1 \\ N_2 \end{bmatrix}, Y_2 = \begin{bmatrix} X_1 & X_2 \end{bmatrix} \begin{bmatrix} H_3 \\ H_4 \end{bmatrix} + \begin{bmatrix} N_3 \\ N_4 \end{bmatrix}, \qquad (5)$$

where:

$$Y_1 = [y_{11} \; y_{12} \; \cdots \; y_{1M}]^T,$$

$$Y_2 = [y_{21} \; y_{22} \; \cdots \; y_{2M}]^T,$$

$$[X_1 \; X_2] = \begin{bmatrix} x_{11} & & 0 & x_{21} & & 0 \\ & x_{12} & & & x_{22} & \\ & & \ddots & & & \ddots \\ 0 & & x_{1M} & 0 & & x_{2M} \end{bmatrix},$$

$$\begin{bmatrix} H_1 \\ H_2 \end{bmatrix} = [h_{11} \; h_{12} \; \cdots \; h_{1M} \; h_{21} \; h_{22} \; \cdots \; h_{2M}]^T,$$

$$\begin{bmatrix} H_3 \\ H_4 \end{bmatrix} = [h_{31} \; h_{32} \; \cdots \; h_{3M} \; h_{41} \; h_{42} \; \cdots \; h_{4M}]^T,$$

$$\begin{bmatrix} N_1 \\ N_2 \end{bmatrix} = [n_{11} \; n_{12} \; \cdots \; n_{1M} \; n_{21} \; n_{22} \; \cdots \; n_{2M}]^T,$$

$$\begin{bmatrix} N_3 \\ N_4 \end{bmatrix} = [n_{11} \; n_{12} \; \cdots \; n_{1M} \; n_{21} \; n_{22} \; \cdots \; n_{2M}]^T.$$

In Equation (5), $X_1$ and $X_2$ respectively represent the data transmitted from antennas 202 and 204 in FIG. 2, $Y_1$ and $Y_2$ respectively represent the data received at antennas 214 and 216 in FIG. 2, $H_1$, $H_2$, $H_3$, and $H_4$ denote the channel frequency responses between the transmitter and receiver antennas over channels 206, 208, 210, and 212, respectively, and $N_1$, $N_2$, $N_3$, and $N_4$ denote Gaussian noise over those same channels. Equation (5) can further be simplified as shown in Equation (6) below:

$$Y_1 = [X_1 \; X_2] \begin{bmatrix} WC_1 \\ WC_2 \end{bmatrix} + \qquad (6)$$

$$\begin{bmatrix} N_1 \\ N_2 \end{bmatrix} = [X_1 \; X_2] \begin{bmatrix} W & 0 \\ 0 & W \end{bmatrix} \begin{bmatrix} C_1 \\ C_2 \end{bmatrix} + \begin{bmatrix} N_1 \\ N_2 \end{bmatrix} = EF \begin{bmatrix} C_1 \\ C_2 \end{bmatrix} + \begin{bmatrix} N_1 \\ N_2 \end{bmatrix}$$

$$Y_2 = EF \begin{bmatrix} C_3 \\ C_4 \end{bmatrix} + \begin{bmatrix} N_3 \\ N_4 \end{bmatrix} \qquad (7)$$

where $E = [X_1 \; X_2]$ and $F = \begin{bmatrix} W & 0 \\ 0 & W \end{bmatrix}$.

In Equations (6) and (7), W denotes the DFT matrix, and $C_1$, $C_2$, $C_3$, and $C_4$ denote the impulse responses of the channels between the transmitter and receiver antennas. E denotes the transmitted data, and F denotes the DFT matrices of all the transmitters.

Equation (6) will have a unique solution if and only if $$L \leq \frac{M_u}{T_N},$$

where $T_N$ denotes the number of transmitters, $M_u$ is the length of the pilot signal, and L is the number of taps. This problem has been solved using least-squares and minimum mean square error methods in various publications, including: (a) Somasegaran; (b) A. Ancora et al., "Down-Samples Impulse Response Least-Squares Channel Estimation for LTE OFDMA," IEEE International conference on Acoustics, Speech and Signal Processing, vol. 3, pp. 293-296, April 2007 (hereinafter, "Ancora"); (c) J. V. D. Beek et al., "On Channel Estimation in OFDM Systems," In Proceeding of Vehicular Technology Conference, vol. 2, pp. 815-819, September 1995 (hereinafter, "Beek"); (d) U.S. Patent Application No. US 2007/0014272 A1, entitled "Pilot and Data Transmission in a Quasi-Orthogonal Single-Carrier Frequency Division Multiple Access System," by R. Palanki et al., published Jan. 18, 2007 (hereinafter, "Palanki"); and (e) K. Eriksson, "Channel Tracking versus Frequency Hopping for Uplink LTE." M.S. project, KTH School of Electrical Engineering, Stockholm, Sweden, 2007 (hereinafter, "Eriksson"). Ancora, Beek, Palanki, and Eriksson are hereby incorporated by reference in their entirety.

In particular, for a channel estimator employing LMMSE estimation in the time domain, and assuming that (i) the channel vector C is Gaussian, independent of the channel noise, and zero-mean-valued and (ii) the channel noise is zero-mean-valued, the LMMSE estimate $\hat{C}$ is given by Equation (8) below:

$$\hat{C} = R_{cy} R_{yy}^{-1} Y, \qquad (8)$$

where:

$$R_{cy} = E\{CY^H\} = R_{cc} F^H E^H, \text{ and}$$

$$R_{yy} = E\{YY^H\} = EFR_{cc}F^H E^H + \sigma_n^2 I_M,$$

where Y is the received signal, $R_{cy}$ is the cross-covariance matrix between the channel vector C and the received signal Y, and $R_{yy}$ is the auto-covariance matrix of the received signal Y. R is the auto-covariance matrix of the channel vector C, $\sigma_n^2$ denotes the noise variance, E and F respectively denote the transmitted data and the DFT matrices of all the transmitters, as defined in Equation (7) above, H denotes the Hermitian conjugate operator, and $I_M$ is the identity matrix. See, e.g., Beek.

Further, for a channel estimator employing LS estimation in the time domain, the LS estimator Ĉ for impulse response can be expressed as shown in Equation (9):

$$\hat{C} = ((EF)^H(EF))^{-1}(EF)^H Y = (F^H E^H EF)^{-1} F^H E^H Y \quad (9)$$

where Y is the received signal, E and F, respectively, denote the transmitted data and the DFT matrices of all the transmitters, as defined in Equation (7) above, and H denotes the Hermitian conjugate operator. See, e.g., Palanki.

Although equations (8) and (9) above were derived based on a 2×2 MIMO system for simplicity of notation, one of ordinary skill in the art may derive corresponding equations for LS and LMMSE channel estimators in an L×L MIMO system, for L greater than two (e.g., in a 4×4 MIMO system). Like the 2×2 MIMO equations above, the LS and LMMSE equations for a 4×4 MIMO system similarly require a matrix inversion, and the inverted matrices have rank 4×4 instead of 2×2.

Given the LS or LMMSE channel estimates, the pilot signals may then be separated by various techniques known to those of ordinary skill in the art, including, e.g., converting the OFDM signals into the time domain and performing windowing operations based on the cyclic shift. For example, U.S. Patent Application Publication No. US 2008/0031375 filed by Zhou et al. (hereinafter, "Zhou"), hereby incorporated by reference in its entirety, describes a channel estimation and separation method in a MIMO-OFDM system. The Zhou method includes (a) Fourier-transforming a plurality of signals received by a receiving antenna; (b) performing channel estimation by a least-squares method based on a known pilot signal; (c) inverse-Fourier-transforming the least-squares channel estimates into an impulse response in the time domain; (d) separating the transformed impulse response into channel impulse responses of the respective signals by use of a window function; and finally (e) obtaining frequency-domain estimated transfer functions for each channel by Fourier-transforming each of the channel impulse responses.

Conventional Blockwise Analytic Matrix Inversion

In order to perform the matrix inversion needed for LS and LMMSE calculations in a 4×4 MIMO system, however, channel estimation unit 150 conventionally employs Blockwise Analytic Matrix (BAM) inversion, which is well known and recommended in many references, especially for MIMO applications, which involve the inversion of relatively small matrices. See, e.g., Johan Eilert, Di Wu, and Dake Liu, "Efficient Complex Matrix Inversion for MIMO Software Defined Radio," IEEE International Symposium on Circuits and Systems, ISCAS 2007, p. 2610-2613, ISBN: 1-4244-0921-7; and Johan Euler, Di Wu, Dake Liu, Dandan Wang, Naofal Al-Dhahir, and Hlaing Minn, "Complexity Reduction of Matrix Manipulation for Multi-User STBC-MIMO Decoding," Sarnoff Symposium, 2007 IEEE, p. 1-5, presented Apr. 30, 2007-May 2, 2007, Princeton, N.J., ISBN: 978-1-4244-2483-2, INSPEC Accession Number:10076341, Digital Object Identifier: 10.1109/SARNOF.2007.4567354, current version published Jul. 16, 2008, both of which are incorporated by reference in their entirety.

The matrix M having size N×N is partitioned into 4 blocks, such that:

$$M = \begin{bmatrix} A & B \\ C & D \end{bmatrix} \quad (10)$$

where A and D are square matrixes of size p×p and s×s respectively (p+s=N). The matrices B and C, which are not necessarily square, have sizes p×s and s×p, respectively.

The inverse of matrix M is given recursively by:

$$M^{-1} = \begin{bmatrix} W + ZX & -Z \\ -YX & Y \end{bmatrix}, \quad (11)$$

where:

$$W = A^{-1} \quad (12)$$

$$X = CW \quad (13)$$

$$Y = (D - XB)^{-1} \quad (14)$$

$$Z = WBY \quad (15)$$

Figure 5A:
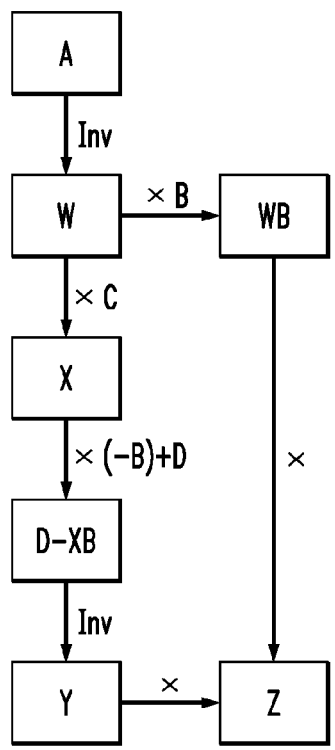
FIGS. 5(a) and 5(b) graphically depict the prior-art BAM inversion used in LTE channel estimation and a modified BAM inversion in accordance with one embodiment of the present invention.

Recursively proceeding with the partitioning described above, one finally reaches trivially inverted matrixes with of sizes such as 2×2 or 3×3. The relation between the intermediate quantities is depicted in FIG. 5(a).

BAM inversion, however, has limited accuracy where division is performed by inexact methods. The calculation of the W and Y matrices requires the inversion of A and of Schur's complement of A (i.e., D−XB), respectively. This in turn involves recursive applications of the algorithm, until one reaches matrices that are small enough to be trivially inverted using Cramer's rule, which gives the inverse of any matrix as:

$$M^{-1} = \frac{\text{adj}(M)}{\det(M)}, \quad (16)$$

where adj(M) and det(M) are the adjugate matrix and the determinant of the matrix M, respectively. (It is noted that, by the adjugate matrix's definition (given, e.g., in Eilert et al., above, and in Petersen et al., above), the calculation of the adjugate matrix (which is sometimes referred to as the classical adjoint) does not require any division operations, but only the calculation of the determinants of sub-matrices and their multiplication by ±1.) Since these divisions are carried out in early steps of the computation, any inaccuracy in this step can be propagated and amplified in subsequent steps.

Further, exact division is known to be a cumbersome operation requiring significant processing power. Approximate methods for division that reduce considerably the computational complexity do exist, but they sacrifice accuracy for speed and inevitably introduce errors.

In the conventional BAM inversion, as given in equations (12) to (15), each step depends upon all preceding steps. The matrix inversion, which involves a division, is carried out in the first and third steps. Consequently, the error caused by using a faster, approximate method for division propagates through the steps of the method and is amplified from one step to another. The error amplification factor can be estimated from the infinity norms of matrices within calculations and also the condition property of matrix (D−XB) (also known as Schur's complement) in equation (14). Hence, the accuracy of the resulting channel estimates may be significantly degraded by a factor that is not trivial to estimate.

The present inventors have modified the conventional BAM inversion, so that, in one embodiment, division operations are deferred to the last stage of the method. By so doing, the error introduced by using fast approximate methods (e.g., lookup tables) for carrying out division is limited.

A. Modified Block Matrix Inversion Method

The present inventors have formulated the inversion in channel estimation unit 150 in a way that defers, until the final step of the inversion, the divisions used in order to invert the matrices in equations (12) and (14). It is shown below that the noise level introduced by the inaccuracy in the division is lower by 2-3 dB compared to the conventional BAM inversion.

Figure 5B:
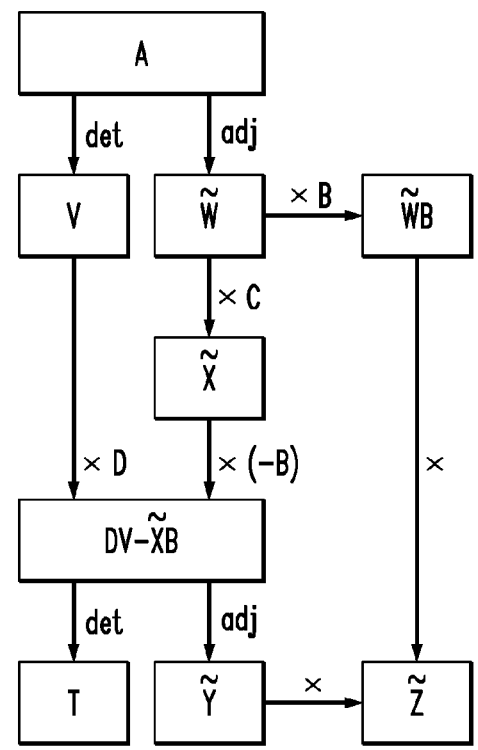

The proposed formulation is given below. The relation between the intermediate quantities defined for this formulation is depicted in FIG. 5(b).

$$M^{-1} = \begin{bmatrix} \frac{\tilde{W}T + \tilde{Z}\tilde{X}}{VT} & -\frac{\tilde{Z}}{T} \\ -\frac{\tilde{Y}\tilde{X}}{T} & \frac{\tilde{Y}V}{T} \end{bmatrix}, \quad (17)$$

where:

$$V = \det(A) \quad (18)$$
$$\tilde{W} = adj(A)$$
$$\tilde{X} = C\tilde{W}$$
$$\tilde{Y} = adj(DV - \tilde{X}B)$$
$$\tilde{Z} = \tilde{W}B\tilde{Y}$$
$$T = \det(DV - \tilde{X}B)$$

It may be noted that none of the parameters calculated in equation (18) involves a division operation. In this embodiment, scalar division is performed only at the last stage of this method, thus avoiding error accumulation from stage to stage.

Where matrix M is hermitian, namely $M^H = M$, alternative expressions for intermediate matrices $\tilde{X}$ and $\tilde{Z}$ may be used, as follows:

$$\tilde{X} = B^H \tilde{W}$$
$$\tilde{Z} = \tilde{X}^H \tilde{Y} \quad (19)$$

B. Example of Modified BAM Inversion for a 4×4 Hermitian Matrix

This section illustrates a stage-by-stage computation applying the proposed method for the specific case in which the input matrix is a Hermitian matrix of size 4×4. This case is commonly used in channel equalization problems arising in LTE systems and other communication systems.

1) Division Implementation by Lookup Table

In one embodiment, channel estimation unit 150 performs division by using a lookup table (stored in a memory within channel estimation unit 150) to approximate the 1/X function in a piecewise-linear fashion, as follows:

(1) pre-scaling parameter X in order to allow the best-possible function-argument, fixed-point presentation;

(2) accessing the lookup table with a pointer composed from the most-significant bits (MSBs) of the scaled argument, where the number of MSBs defines the precision of the calculation; and (3) post-scaling, in the direction opposite to that determined at the pre-scale stage, the resulting value returned from the lookup table.

2) Modified BAM Inversion Stages for 4×4 Hermitian Matrix

For the 2×2 case, $\det(A) = a_{11}a_{22} - a_{12}a_{21}$, and $$adj(A) = \begin{bmatrix} a_{22} & -a_{12} \\ -a_{21} & a_{11} \end{bmatrix} \quad (20)$$

Because matrix M is hermitian, the alternative definitions of intermediate matrices $\tilde{X}$ and $\tilde{Z}$ for this case, given in equation (19), may be used. Further, because matrix M to be inverted is hermitian, matrix A is hermitian, hence the determinant det(A) is real. Intermediate quantity T is also real, because it equals the determinant of Schur's complement of matrix M multiplied by V (i.e., the determinant det(A)).

FIG. 4 depicts an embodiment of channel estimator 150, which may be implemented via one or more processors 402 connected to at least one memory 404, and the inversion may be carried out in six stages. Each stage comprises a plurality of operations, and at least some of the operations of each stage are independent of each other and thus can be carried out concurrently, e.g., by the one or more processors 402 in channel estimation unit 150. Because the operations are matrix operations, the one or more processors 402 preferably include one or more vector processors.

Figure 5C:
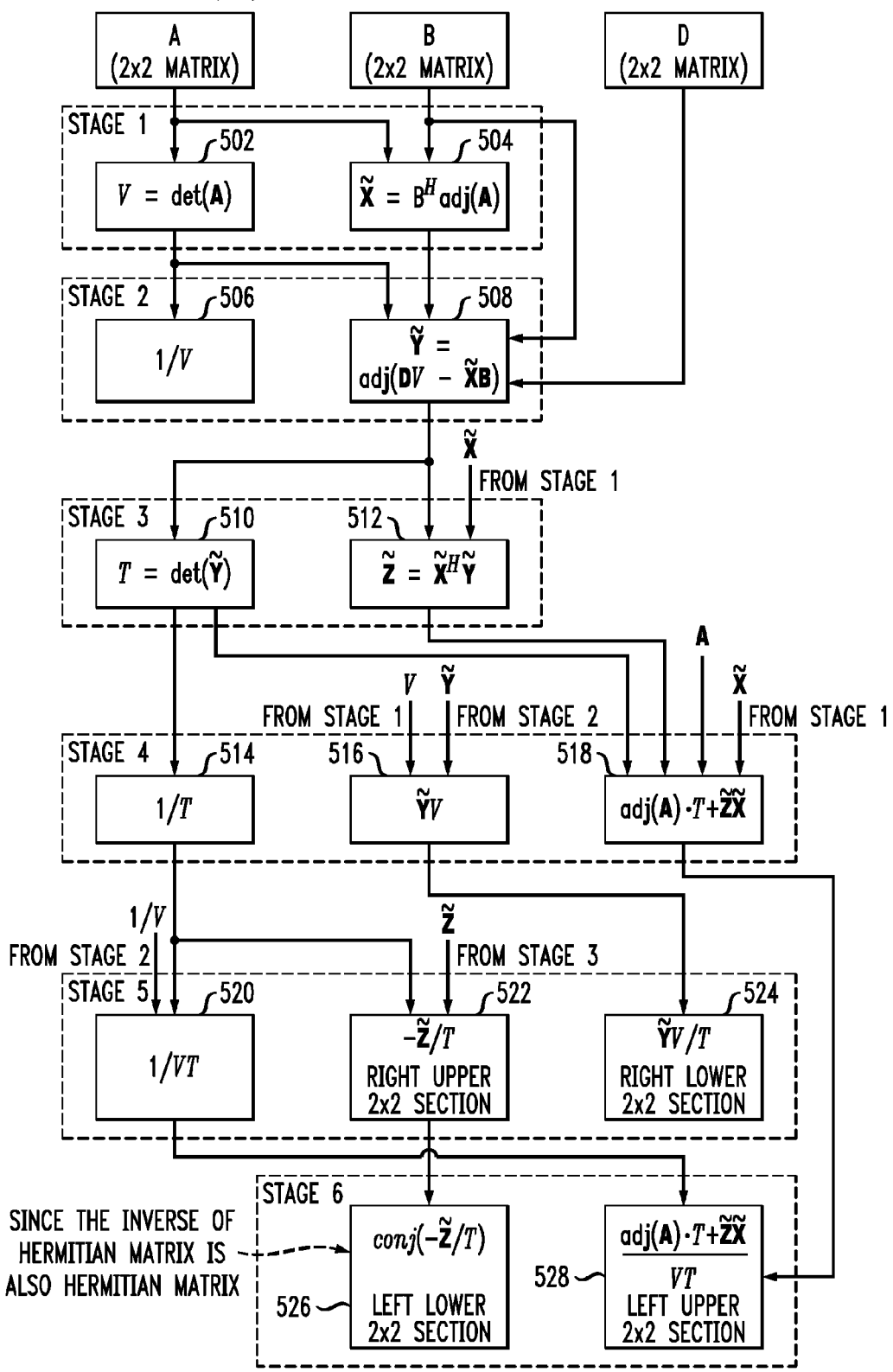
FIG. 5(c) graphically depicts a modified BAM inversion in accordance with another embodiment of the present invention, for the specific case in which the input matrix is a Hermitian matrix of size 4×4.

FIG. 5(c) depicts the stage-by-stage computation for the specific case in which the input matrix is a Hermitian matrix of size 4×4.

Stage 1:

1A. In block 504, channel estimation unit 150 determines intermediate matrix $\tilde{X} = B^H \cdot adj(A)$, where matrix B is a general 2×2 matrix and the adjugate matrix adj(A) is a hermitian 2×2 matrix. For the definition of adjugate matrix adj(A), see equation (20). Because computing the adjugate of a 2×2 matrix involves only reordering of terms and sign changes, adjugate matrix adj(A) can be used directly without computing it from matrix A as an intermediate step.

1B In block 502, channel estimation unit 150 determines V=det(A).

Stage 2:

2A In block 506, channel estimation unit 150 determines 1/V.

2B In block 508, channel estimation unit 150 determines $\tilde{Y} = adj(DV - \tilde{X}B)$, where V is a real scalar, matrix D is a hermitian 2×2 matrix and intermediate matrices $\tilde{X}$ and B are general 2×2 matrices. Because Product $\tilde{X}B$ is hermitian, only the elements of the main diagonal plus the elements above the main diagonal need to be calculated. The remaining elements below the main diagonal may then be determined by taking the conjugate of the calculated elements above the main diagonal.

Stage 3:

3A In block 512, channel estimation unit 150 determines intermediate matrix $\tilde{Z} = \tilde{X}^H \tilde{Y}$, where intermediate matrix $\tilde{X}^H$ is a general 2×2 matrix and intermediate matrix $\tilde{Y}$ is a hermitian 2×2 matrix.

3B In block 510, channel estimation unit 150 determines $T = \det(\tilde{Y})$, where $\tilde{Y}$ is a hermitian matrix and hence T is a real scalar.

Stage 4:

4A In block 518, channel estimation unit 150 determines $adj(A) \cdot T + \tilde{Z}\tilde{X}$, where adjugate matrix adj(A) is hermitian, intermediate quantity T is a real scalar, and product $\tilde{Z}\tilde{X}$ is hermitian.

4B In block 516, channel estimation unit 150 determines product $\tilde{Y}V$, where intermediate matrix $\tilde{Y}$ is a hermitian 2×2 matrix and intermediate quantity V is a real scalar.

4C In block 514, channel estimation unit 150 determines 1/T, where intermediate quantity T is a real scalar.

Stage 5:

5A In block 522, channel estimation unit 150 determines $-\tilde{Z}/T$, where intermediate matrix $\tilde{Z}$ is a general matrix and 1/T is a real scalar, and places the result in a right upper 2×2 section of inverted matrix $M^{-1}$.

5B In block 524, channel estimation unit 150 determines product $$\frac{\tilde{Y}V}{T},$$

where product $\tilde{Y}V$ is a hermitian 2×2 matrix and 1/T is a real scalar, and places the result in a right lower 2×2 section of inverted matrix $M^{-1}$.

5C In block 520, channel estimation unit 150 determines product $$\frac{1}{V} \cdot \frac{1}{T},$$

where 1/V and 1/T are real scalars.

Stage 6:

6A In block 526, considering that the inverse matrix $M^{-1}$ is hermitian because matrix M is hermitian, channel estimation unit 150 determines conj($-Z/T$) and places the result in the left lower 2×2 section of inverted matrix $M^{-1}$.

6B In block 528, channel estimation unit 150 determines $$\frac{adj(A) \cdot T + \tilde{Z}\tilde{X}}{VT},$$

where $adj(A) \cdot T + \tilde{Z}\tilde{X}$ is a hermitian 2×2 matrix and $$\frac{1}{VT}$$

is a real scalar, and places the result in the left upper 2×2 section of inverted matrix $M^{-1}$, thereby completing the inversion of matrix M.

In an alternative embodiment, instead of determining the intermediate quantity 1/VT by determining 1/V in block 506 and 1/T in block 514 and then taking the product in block 520 to obtain the intermediate quantity 1/VT, intermediate quantity 1/VT may be determined by generating the product V*T and then taking the inverse of product V*T.

In order to confirm that the above-described modified BAM inversion embodiment does, in fact, give superior performance compared with the conventional BAM inversion, the present inventors evaluated the error added by the inaccuracy in the divisions. Because both the conventional BAM inversion and the modified BAM inversion are most practical for relatively small matrices, the study was limited to 4×4, 5×5, and 6×6 complex matrices. For these sizes, the blocks are 2×2 or 3×3, so they are trivially invertible. The matrices were general (without any particular properties) and were randomly generated.

The Model

Because the matrices whose inverses are to be computed are complex, it is necessary to divide by the complex determinants of sub-matrices. This inverse of the complex scalar z is computed as:

$$\frac{1}{z} = \frac{\bar{z}}{\bar{z}z} = \frac{\bar{z}}{|z|^2} \quad (21)$$

where the overbar denotes complex conjugation. Subsequently, $$\frac{1}{|z|^2}$$

is computed using a lookup table, indexed by the p leading non-zero bits of $|z|^2$, where p varies between 5 and 10. In the study, this behavior is simulated by rounding $|z|^2$ down to the nearest multiple of $$2^{\lceil log_2 |z^2| \rceil - p}.$$

The result of this computation is used as a divisor instead of $|z|^2$.

Results

The inverses of the generated matrices were computed in three ways: (1) exactly, using a conventional inversion in the Linear Algebra Package (LAPACK), a software library for numerical linear algebra available from the University of Tennessee at http://www.netlib.org/lapack/; (2) using the conventional BAM inversion, with imprecision introduced in the division; and (3) using the modified BAM inversion, with imprecision introduced in the division.

The differences between the results of cases (2) and (3) above and the exact result in case (1) above are considered noise. The ratios of the noise levels to the exact values are given as results.

Figure 6:
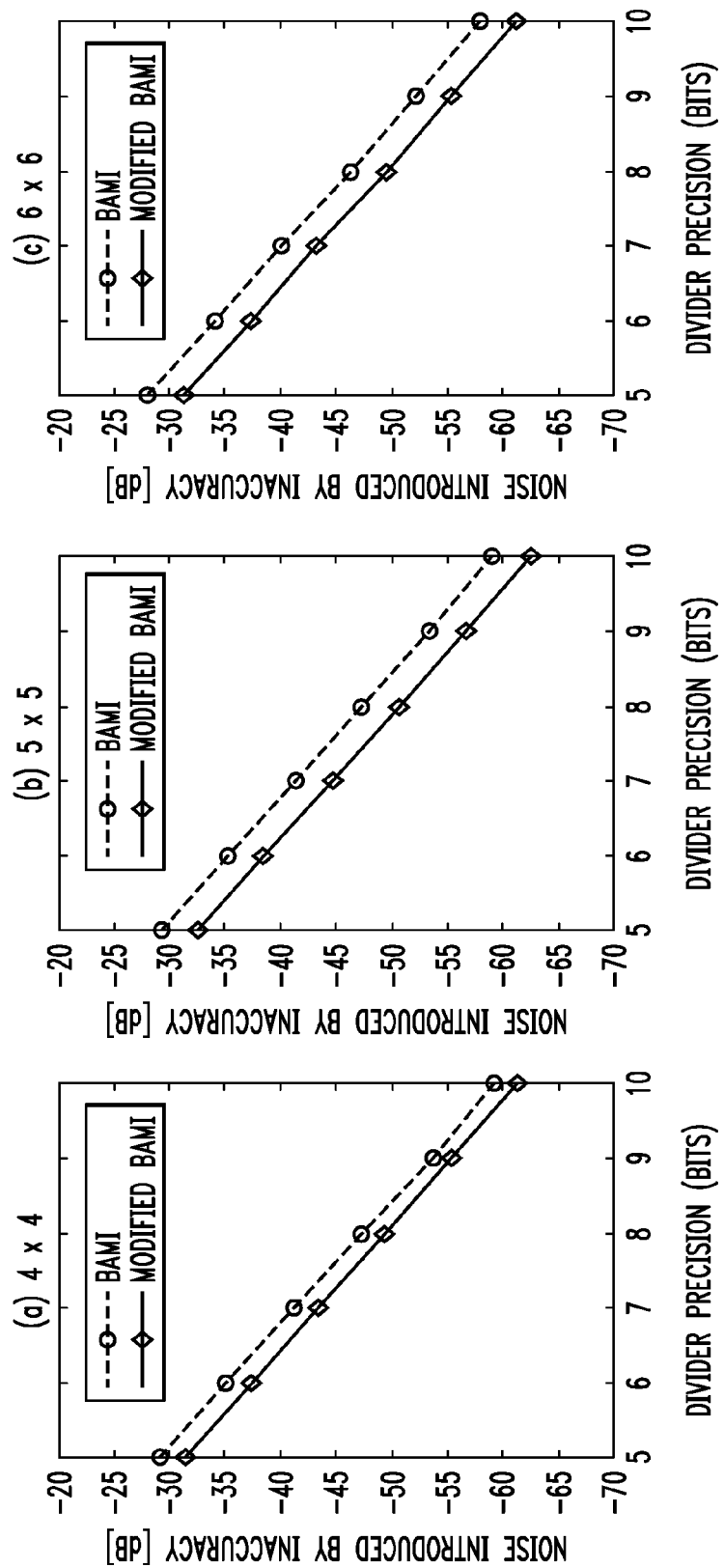
FIGS. 6(a), 6(b), and 6(c) are graphs illustrating noise (in dB) introduced by inaccuracy in division versus the number p of bits used to represent a divider, using the conventional BAM inversion and the modified BAM inversion for complex matrices of size (a) 4×4, (b) 5×5, and (c) 6×6.

FIGS. 6(a), 6(b), and 6(c) demonstrate the level of noise introduced by the inaccuracy in the division vs. the number p of significant leading bits used to represent the divider. The results of the conventional BAM inversion are shown as a dashed line, and the results of the modified BAM inversion are shown as a solid line. FIGS. 6(a), 6(b), and 6(c) respectively depict results for complex matrices of size (a) 4×4, (b) 5×5, and (c) 6×6.

FIG. 7 depicts Table 1, summarizing the differences in noise level introduced by the inaccuracy in division for the conventional BAM inversion and the modified BAM inversion embodiment. It can be seen that the advantage of the modified BAM inversion over the conventional BAM inversion is consistent and is typically 2-3 dB. Because the modified BAM inversion is more accurate than conventional BAM inversion, channel estimation unit 150 may employ methods of division with lower accuracy (e.g., division via a smaller look-up table).

There has thus been described an embodiment of a channel estimation unit adapted to perform a modified BAM inversion that provides better performance than existing channel estimation units using conventional BAM inversion. It will be understood, however, that various changes in the details, materials, and arrangements of the parts which have been described and illustrated in order to explain the nature of this invention may be made by those skilled in the art without departing from the scope of the invention as expressed in the following claims. For example, it will be recognized that the modified BAM inversion described above may be applied both to MIMO systems as well as multiple-input, single-output (MISO). (It is noted, however, that modified BAM inversion is not recommended for use in a 2×2 MIMO system, because inversions in such a system may be performed using other, simpler inversion techniques known to those of ordinary skill in the art.)

The modified BAM inversion described above may also be advantageously employed in other signal processing applications that require matrix inversion. For example, beam-forming applications require matrix inversions to calculate each antennas' gain. See, e.g., U.S. Pat. No. 7,054,664, hereby incorporated by reference in its entirety. Similarly, modified BAM inversion may be used in least-square equalization (e.g., via a zero-forcing equalizer), echo-cancellation, polynomial-fitting, least-square interpolation, recursive-least-square (RLS) adaptive filtering, Weiner filtering, Kalman filtering, and weighted-least-square filtering and equalization.

The present invention may be implemented as analog, digital, or a hybrid of both analog and digital circuit based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro controller, or general purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A machine-implemented method for signal processing, comprising:
  (a) a processor receiving an electrical input signal via one or more terminals;
  (b) the processor processing the electrical input signal to generate a matrix M;
  (c) the processor inverting the matrix M to generate an inverted matrix $M^{-1}$ by:
    (c1) decomposing the matrix M into a plurality of first sub-matrices,
    (c2) generating, based on the first sub-matrices and without any division operations, numerators for a plurality of second sub-matrices of the inverted matrix $M^{-1}$,
    (c3) generating, based on the first sub-matrices and without any division operations, denominators for the second sub-matrices, and
    (c4) generating the second sub-matrices based on the numerators and denominators; and (d) the processor processing the inverted matrix $M^{-1}$ to generate an electrical output signal, wherein processing the inverted matrix $M^{-1}$ to generate an electrical output signal comprises equalizing one or more signals based on the inverted matrix $M^{-1}$.

2. The invention of claim 1, wherein:
the numerators are intermediate matrices; and
the denominators are real scalars.

3. The invention of claim 2, wherein each real-scalar denominator is generated based on a determinant of either a first sub-matrix or an intermediate matrix formed from at least one first sub-matrix.

4. The invention of claim 1, wherein:
the plurality of sub-matrices comprise sub-matrices A, B, C, and D, and
generating the second sub-matrices based on the numerators and denominators comprises determining:
where:

$$M^{-1} = \begin{bmatrix} \dfrac{\tilde{W}T + \tilde{Z}\tilde{X}}{VT} & -\dfrac{\tilde{Z}}{T} \\ -\dfrac{\tilde{Y}\tilde{X}}{T} & \dfrac{\tilde{Y}V}{T} \end{bmatrix},$$

where:

$V = \det(A)$
$\tilde{W} = adj(A)$
$\tilde{X} = C\tilde{W}$
$\tilde{Y} = adj(DV - \tilde{X}B)$
$\tilde{Z} = \tilde{W}B\tilde{Y}$, and
$T = \det(DV - \tilde{X}B)$.

5. The invention of claim 1, wherein:
matrix M is hermitian,
the plurality of sub-matrices comprise sub-matrices A, B, C, and D, and
generating the second sub-matrices based on the numerators and denominators comprises determining:

$$M^{-1} = \begin{bmatrix} \dfrac{\tilde{W}T + \tilde{Z}\tilde{X}}{VT} & -\dfrac{\tilde{Z}}{T} \\ -\dfrac{\tilde{Y}\tilde{X}}{T} & \dfrac{\tilde{Y}V}{T} \end{bmatrix}$$

where:

$V = \det(A)$
$\tilde{W} = adj(A)$
$\tilde{X} = B^H \tilde{W}$
$\tilde{Y} = adj(DV - \tilde{X}B)$
$\tilde{Z} = \tilde{X}^H \tilde{Y}$, and
$T = \det(DV - \tilde{X}^H B)$.

6. The invention of claim 5, wherein the intermediate quantity $$-\dfrac{\tilde{Y}\tilde{X}^H}{T}$$

is determined by determining conj(-Z/T).

7. The invention of claim 1, wherein: processing the inverted matrix $M^{-1}$ to generate an output signal further comprises: calculating a plurality of channel estimates based on the inverted matrix $M^{-1}$; and equalizing one or more signals based on the inverted matrix comprises equalizing a plurality of intermediate signals derived from the input signal.

8. The invention of claim 7, wherein processing the inverted matrix $M^{-1}$ to generate an output signal further comprises:
de-mapping the intermediate signals to produce a plurality of de-mapped signals;
performing an inverse Fourier transform on the de-mapped signals to produce a plurality of transformed signals;
parallel-to-serial converting the transformed signals to produce a serial signal; and
demodulating the serial signal to produce the output signal.

9. The invention of claim 1, wherein step (c) is performed using modified Blockwise Analytic Matrix inversion.

10. The invention of claim 1, wherein at least one of the denominators is not equal to 1.

11. The invention of claim 1, wherein the processor is a vector processor.

12. An apparatus for machine-implemented signal processing, comprising:
at least one processor adapted to:
(a) receive an electrical input signal via one or more terminals;
(b) process the electrical input signal to generate a matrix M;
(c) invert the matrix M to generate an inverted matrix $M^{-1}$ by:
(c1) decomposing the matrix M into a plurality of first sub-matrices,
(c2) generating, based on the first sub-matrices and without any division operations, numerators for a plurality of second sub-matrices of the inverted matrix $M^{-1}$,
(c3) generating, based on the first sub-matrices and without any division operations, denominators for the second sub-matrices, and
(c4) generating the second sub-matrices based on the numerators and denominators; and (d) process the inverted matrix $M^{-1}$ to generate an electrical output signal wherein processing the inverted matrix $M^{-1}$ to generate an electrical output signal comprises equalizing one or more signals based on the inverted matrix $M^{-1}$.

13. The invention of claim 12, wherein:
the numerators are intermediate matrices; and
the denominators are real scalars.

14. The invention of claim 13, wherein each real-scalar denominator is generated based on a determinant of either a first sub-matrix or an intermediate matrix formed from at least one first sub-matrix.

15. The invention of claim 12, wherein:
the plurality of sub-matrices comprise sub-matrices A, B, C, and D, and
the at least one processor is adapted to generate the second sub-matrices based on the numerators and denominators by determining:

$$M^{-1} = \begin{bmatrix} \dfrac{\tilde{W}T + \tilde{Z}\tilde{X}}{VT} & -\dfrac{\tilde{Z}}{T} \\ -\dfrac{\tilde{Y}\tilde{X}}{T} & \dfrac{\tilde{Y}V}{T} \end{bmatrix},$$

where:

$V = \det(A)$
$\tilde{W} = adj(A)$
$\tilde{X} = C\tilde{W}$
$\tilde{Y} = adj(DV - \tilde{X}B)$
$\tilde{Z} = \tilde{W}B\tilde{Y}$, and
$T = \det(DV - \tilde{X}B)$.

16. The invention of claim 12, wherein:
matrix M is hermitian,
the plurality of sub-matrices comprise sub-matrices A, B, C, and D, and
the at least one processor is adapted to generate the second sub-matrices based on the numerators and denominators by determining:

$$M^{-1} = \begin{bmatrix} \dfrac{\tilde{W}T + \tilde{Z}\tilde{X}}{VT} & -\dfrac{\tilde{Z}}{T} \\ -\dfrac{\tilde{Y}\tilde{X}}{T} & \dfrac{\tilde{Y}V}{T} \end{bmatrix}$$

where:

$V = \det(A)$ $\tilde{W} = adj(A)$ $\tilde{X} = B^H \tilde{W}$ $\tilde{Y} = adj(DV - \tilde{X}B)$ $\tilde{Z} = \tilde{X}^H \tilde{Y}$, and $T = \det(DV - \tilde{X}^H B)$.

17. The invention of claim 16, wherein the at least one processor is adapted to determine the intermediate quantity $$-\dfrac{\tilde{Y}\tilde{X}^H}{T}$$

by determining conj(−Z/T).

18. The invention of claim 12, wherein the at least one processor is adapted to process the inverted matrix $M^{-1}$ to generate the output signal by:
    calculating a plurality of channel estimates based on the inverted matrix $M^{-1}$, and
    equalizing a plurality of intermediate signals derived from the input signal.

19. The invention of 18, wherein the at least one processor is further adapted to process the inverted matrix $M^{-1}$ to generate an output signal by:
    de-mapping the intermediate signals to produce a plurality of de-mapped signals,
    performing an inverse Fourier transform on the de-mapped signals to produce a plurality of transformed signals,
    parallel-to-serial converting the transformed signals to produce a serial signal, and
    demodulating the serial signal to produce the output signal.

20. The invention of claim 12, wherein the at least one processor is adapted to invert the matrix to generate the inverted matrix using modified Blockwise Analytic Matrix inversion.

21. The invention of claim 12, wherein at least one of the denominators is not equal to 1.

22. The invention of claim 12, wherein the processor is a vector processor.

23. A machine-implemented method for signal processing, comprising:
    (a) a processor receiving an electrical input signal via one or more terminals;
    (b) the processor processing the electrical input signal to generate a matrix M;
    (c) the processor inverting the matrix M to generate an inverted matrix $M^{-1}$ by:
        (c1) decomposing the matrix M into a plurality of first sub-matrices,
        (c2) generating, based on the first sub-matrices and without any division operations, numerators for a plurality of second sub-matrices of the inverted matrix $M^{-1}$,
        (c3) generating, based on the first sub-matrices and without any division operations, denominators for the second sub-matrices, and
        (c4) generating the second sub-matrices based on the numerators and denominators;
    (d) the processor processing the inverted matrix $M^{-1}$ to generate an electrical output signal; and
    (e) an equalizer unit equalizing one or more signals based on the electrical output signal.

24. A machine-implemented for signal processing, comprising:
    (a) a processor receiving an electrical input signal via one or more terminals;
    (b) the processor processing the electrical input signal to generate a matrix M;
    (c) the processor inverting the matrix M to generate an inverted matrix $M^{-1}$ by:
        (c1) decomposing the matrix M into a plurality of first sub-matrices,
        (c2) generating, based on the first sub-matrices and without any division operations, numerators for a plurality of second sub-matrices of the inverted matrix $M^{-1}$,
        (c3) generating, based on the first sub-matrices and without any division operations, denominators for the second sub-matrices, and
        (c4) generating the second sub-matrices based on the numerators and denominators; and
    (d) the processor processing the inverted matrix $M^{-1}$ to generate an electrical output signal, wherein processing the inverted matrix $M^{-1}$ to generate an electrical output signal comprises separating a plurality of channels of the electrical input signal based on the inverted matrix $M^{-1}$.

* * * * *